United States Patent
Chang

(10) Patent No.: US 9,904,655 B2
(45) Date of Patent: Feb. 27, 2018

(54) SPLITTER MODULE AND TRANSMITTING EXTENDER HAVING THE SAME THEREOF

(71) Applicant: NUETEQ TECHNOLOGY, INC., Taipei (TW)

(72) Inventor: Hui-Chih Chang, Taipei (TW)

(73) Assignee: NUETEQ TECHNOLOGY, INC., Taipei (TW)

( * ) Notice: Subject to any disclaimer, the term of this patent is extended or adjusted under 35 U.S.C. 154(b) by 17 days.

(21) Appl. No.: 15/096,698

(22) Filed: Apr. 12, 2016

(65) Prior Publication Data

US 2017/0192931 A1    Jul. 6, 2017

(30) Foreign Application Priority Data

Dec. 31, 2015 (TW) .............................. 104144697 A

(51) Int. Cl.
 *G06F 13/42* (2006.01)
 *G06F 13/38* (2006.01)
 *G06F 13/40* (2006.01)

(52) U.S. Cl.
 CPC ........ *G06F 13/4282* (2013.01); *G06F 13/385* (2013.01); *G06F 13/4022* (2013.01); *G06F 13/4045* (2013.01)

(58) Field of Classification Search
 CPC .............. G06F 13/4282; G06F 13/385; G06F 13/4022; G06F 13/4045
 USPC ........................................................ 710/63
 See application file for complete search history.

(56) References Cited

U.S. PATENT DOCUMENTS

| | | | | |
|---|---|---|---|---|
| 6,324,605 B1* | 11/2001 | Rafferty | ............... | G06F 13/4022 710/100 |
| 7,502,878 B1* | 3/2009 | Wright | ................ | G06F 13/4022 710/37 |
| 2004/0205276 A1* | 10/2004 | Ferguson | ............ | G06F 13/4022 710/305 |
| 2007/0094422 A1* | 4/2007 | Huang | ................... | G06F 3/0619 710/14 |
| 2009/0210608 A1* | 8/2009 | Chang | .................. | G06F 13/4022 710/316 |
| 2010/0115160 A1* | 5/2010 | Cheng | .................... | G06F 13/385 710/73 |
| 2012/0260018 A1* | 10/2012 | Lin | ...................... | G06F 13/4022 710/316 |
| 2014/0250239 A1* | 9/2014 | Lambert | ................. | H04L 45/54 709/242 |
| 2016/0117276 A1* | 4/2016 | Park | ....................... | G06F 13/385 710/63 |

(Continued)

*Primary Examiner* — Christopher Shin
(74) *Attorney, Agent, or Firm* — Li & Cai Intellectual Property (USA) Office

(57) ABSTRACT

Disclosed are a splitter module and a transmission extender having the same. The splitter module comprises a processing unit, a first USB port, a second USB port and a third USB port. An extender is electrically connected to a plurality of input devices through a hub. The extender transmits a USB signal to the third USB port of the splitter module through a USB port. The processing unit processes the USB signal by splitting it into a HID signal and a high speed signal not from any HID device. After that, the HID signal is transmitted to the KVM switch through the first USB port, and the high speed signal not from any HID device is transmitted to the KVM switch through the second USB port.

6 Claims, 4 Drawing Sheets

(56) References Cited

U.S. PATENT DOCUMENTS

2016/0203343 A1\* 7/2016 Soffer ................... G06F 13/102
  726/34
2016/0224493 A1\* 8/2016 Wang .................... G06F 13/385

\* cited by examiner

SPLITTER MODULE AND TRANSMITTING EXTENDER HAVING THE SAME THEREOF

BACKGROUND OF THE INVENTION

1. Field of the Invention

The instant disclosure relates to a splitter module and a transmission extender having the same; in particular, to a splitter module and a transmission extender having the same that are electrically connected to a Keyboard Video Mouse (KVM) switch.

2. Description of Related Art

As known, a KVM switch can be electrically connected to a plurality of computer hosts, such as a personal computer (PC), a laptop, a server computer and other types of computers. By the KVM switch, the computer host can be indirectly connected to a plurality of devices, wherein the KVM switch usually needs an extender and/or a hub to connect with devices.

For instance, the hub can provide the KVM switch with a plurality of USB ports, and each USB port can be electrically connected to a device. Specifically, the hub has one input end and multiple output ends. The input end of the hub is electrically connected to, for example, a computer host. The output ends of the hub are electrically connected to devices, wherein the input end of the hub cannot be electrically connected to any device, and the output ends of the hub cannot be electrically connected to any computer host.

However, in a KVM system, there are often a plurality of transmission extenders needed to provide more USB channels for a user to use a mouse, a keyboard, a flash drive, an external hard disk or other input devices at the same time, which makes the whole KVM system rather complex. Briefly, in a traditional KVM system, users may not be able to use a mouse, a keyboard, a flash drive, an external hard disk or other input device at the same time, or even if they can, the configuration of the KVM system is very complex.

SUMMARY OF THE INVENTION

The instant disclosure provides a splitter module and a transmission extender having the same. For convenience, the splitter module and the transmission extender having the same use two USB ports to be connected to a computer host.

Specifically, the instant disclosure provides a splitter module. The splitter module comprises a processing unit, a first USB port, a second USB port and a third USB port. The processing unit is a signal splitter, and configured to split a USB signal into an HID device signal and a high speed signal not from any HID device. The first USB port is electrically connected to the processing unit, and configured to transmit the HID device signal to a computer host. The second USB port is electrically connected to the processing unit, and configured to transmit the high speed signal to the computer host. The third USB port is electrically connected to the processing unit to receive the USB signal from at least one input device.

In addition, the instant disclosure provides a transmission extender having a splitter module. The transmission extender is electrically connected to a KVM switch, and the KVM switch is electrically connected to a plurality of computer hosts. The transmission extender having the splitter module comprises a processing unit, a first USB port, a second USB port, a transmission extender module and a communication port. The processing unit is a signal splitter, and configured to split a USB signal into an HID device signal and a high speed signal not from any HID device. The first USB port is electrically connected to the processing unit, and configured to transmit the HID device signal to a computer host. The second USB port is electrically connected to the processing unit, and configured to transmit the high speed signal to the computer host. The transmission extender module is electrically connected to the processing unit. The communication port is electrically connected to the transmission extender module to receive the USB signal from at least one input device.

To sum up, the splitter module and the transmission extender having the same provided by the instant disclosure use two USB ports to be electrically connected to a computer host. The splitter module splits a USB signal into an HID signal and a high speed signal not from any HID device, to provide a more convenient way for signal transmission between the KVM switch and the transmission extender. The HID signal refers to a mouse signal, a keyboard signal or the like. The high speed signal not from any HID device refers to a signal from a flash drive, an external hard disk or the like.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements, but these elements should not be limited by these terms. These terms are only to distinguish one element from another region or section discussed below. For example, a first element could be termed a second element, and similarly, a second element could be termed a first element, without departing from the teachings of the instant disclosure. As used herein, the term "and/or" includes any and all combinations of one or more of the associated listed items.

Figure 1:
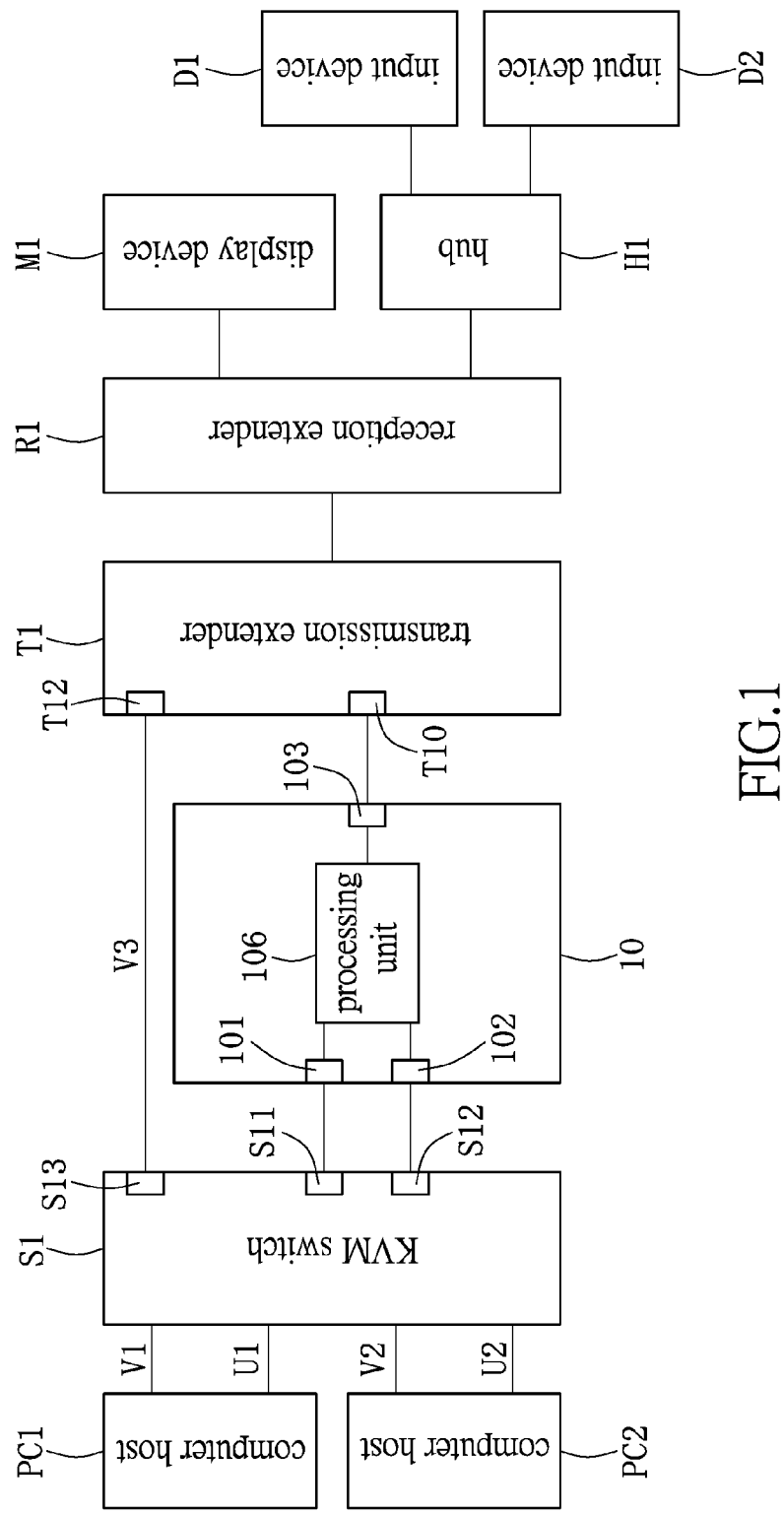
FIG. 1 shows a block diagram of a splitter module configured in a KVM system of one embodiment of the instant disclosure.

Refer to FIG. 1. FIG. 1 shows a block diagram of a splitter module configured in a KVM system of one embodiment of the instant disclosure. As shown in FIG. 1, a splitter module 10 is electrically connected to a KVM switch S1. The KVM switch S1 is electrically connected to a plurality of computer hosts PC1 and PC2. The splitter module 10 comprises a processing unit 106, a first USB port 101, a second USB port 102 and a third USB port 103. The processing unit 106 is electrically connected to the first USB port 101, the second USB port 102 and the third USB port 103

For the ease of illustration, in this embodiment, where the splitter module 10 is configured is considered a central position. In other words, the computer hosts PC1 and PC2 electrically connected to the KVM switch S1 are configured in front of the splitter module 10. The input devices D1 and D2 electrically connected to the reception extender R1 are configured behind the splitter module 10.

The computer hosts PC1 and PC2 are, for example, a personal computer (PC), a laptop, a server computer, a cloud computer or other type of computers. The input devices D1 and D2 are, for example, a flash drive, a mouse, a keyboard, a joystick or other input devices. For the ease of illustration, in the following description, the input device D1 refers to a mouse or a keyboard and the input device D2 refers to a flash drive or an external hard disk. The input device D1 is a device transmitting the HID device signal, such as a signal from a mouse or a keyboard, and the input device D2 is a device transmitting the high speed signal from a flash or an external hard disk but not from any HID device.

In addition, in this embodiment, the splitter module 10 is, for example, a USB HID splitter. The signal generated by the input devices D1 and D2 is transmitted from the back of the splitter module to the front of the splitter module, wherein the signal is split into an HID device signal and a high speed signal that is not from any HID device by the splitter module 10. The HID device signal is transmitted to the KVM switch S1 through the first USB port 101, and the high speed signal not from any HID device is transmitted to the KVM switch S1 through the second USB port 102. In other embodiments, the splitter module 10 can be integrated into the transmission extender T1, but it is not limited herein.

Generally, the KVM switch S1 can have a plurality of USB ports by using a hub H1, and each USB port is provided to electrically connect the KVM switch S1 and the input device D1 or D2. In other words, the hub H1 has one input and multiple outputs. The input end of the hub H1 is electrically connected to the computer host C1 or C2 configured at the front of the splitter module. The output ends of the hub H1 are electrically connected to the input devices D1 and D2 configured at the back of the splitter module. The input end of the hub H1 cannot be electrically connected to any input device D1 or D2, and the output ends of the hub H1 cannot be electrically connected to any computer host C1 or C2.

The KVM switch S1 has a plurality of USB ports S10 and S12. The transmission extender T1 has only one USB port T10. Thus, the KVM switch S1 can only use one USB transmission line to be electrically connected to the transmission extender T1. In other words, in this case, the KVM switch S1 can only transmit an HID signal or a high speed signal not from any HID device at one time. Thus, a user is not allowed to use the keyboard, the mouse, the flash and the external hard disk at the same time. In other words, when the user uses a mouse or a keyboard, he cannot use a flash drive or an external hard disk simultaneously, and vice versa.

If the user needs to use a keyboard, a mouse and a flash at the same time, the KVM switch S1 needs to be electrically connected to two transmission extenders T1 via two USB transmission lines, whereby the user can use a keyboard, a mouse, a flash and an external hard disk at the same time. Specifically, one USB transmission line is to transmit the signal from the mouse or the keyboard, and the other USB transmission line is to transmit the full-speed, high-speed or super-speed USB signal.

In this embodiment, the splitter module 10 has one input end and multiple output ends. The input end of the splitter module 10 is electrically connected to the input device D1 or D2 configured at the back of the splitter module 10. The output ends of the splitter module 10 are electrically connected to the computer hosts PC1 and PC2 configured at the front of the splitter module 10. In other words, the first USB port 101 and the second USB port 102 are electrically connected to the computer hosts PC1 and PC2 respectively, and the third USB port 103 is electrically connected to the input device D1 or D2. Thus, the splitter module 10 helps the signal to be transmitted between the KVM switch S1 and the transmission extender T1 in a way that a user can use a keyboard, a mouse, a flash and an external hard disk at the same time.

Specifically, the processing unit 106 is, for example, a signal splitter, to split a USB signal into an HID device signal and a high speed signal not from any HID device. The processing unit 106 can be, for example, a processor, a microprocessor, and a control circuit, a processing circuit or a determination circuit having semi-conductor electric elements. The processing unit 106 has a processing program, a control circuit or firmware for splitting a USB signal into an HID device signal and a high speed signal not from any HID device. However, the configuration of the processing unit 106 is not limited herein.

The HID device signal differs from the high speed signal not from the HID device. The HID device signal can be, for example, a low speed USB signal. In other words, the HID device signal refers to the signal from a mouse or a keyboard, which is an HID device. The high speed signal not from the HID device can be, for example, a full-speed USB signal, a high-speed USB signal and a super-speed USB signal. In other words, the high speed signal not from the HID device can also be called the non-HID signal, and refers to the signal from a flash drive, an external hard disk or a blue-ray writer, which is not a HID device.

The first USB port 101 is electrically connected to the KVM switch S1 and the processing unit 106. The first USB port 101 is for transmitting the signal from the mouse, the keyboard, or both of them. In brief, the first USB port 101 uses the USB HID protocol.

The second USB port 102 is electrically connected to the KVM switch S1 and the processing unit 106. The second USB port 102 uses USB protocols excluding the USB HID protocol. In other words, the second USB port 102 is not a USB port implementing signal transmission under the USB HID protocol. Moreover, the third USB port 103 is electrically connected to the processing unit 106 and a transmission extender T1. The third USB port 103 is a USB port implementing the signal transmission under any USB protocol. However, the type of the first USB port 101, the second USB port 102 and the third USB port 103 is not limited herein.

The extender comprises, for example, a transmission extender T1 and a reception extender R1. The reception extender R1 is electrically connected to the transmission extender T1 and a hub H1. The hub H1 is electrically connected to the input devices D1 and D2. The reception extender R1 is electrically connected to a plurality of input devices D1 and D2 through a hub H1, wherein the hub H1 provides at least one USB port for transmitting the HID device signal, and at least one USB port for transmitting the high speed signal not from any HID device.

The transmission extender T1 transmits a USB signal to the third USB port 103 of the splitter module 10 through a USB port T10. The processing unit 106 processes the USB signal by splitting it into an HID device signal and a high speed signal not from any HID device. After that, the processing unit 106 transmits the HID device signal to the KVM switch S1 (or, a computer host) through the first USB port 101, and transmits the high speed signal not from any HID device to the KVM switch S1 (or, a computer host) through the second USB port 102.

From the above, it can be understood that, the splitter module 10 in this embodiment can split a USB signal into an HID device signal and a high speed signal not from any HID device. The HID device signal transmitted through the first USB port 101 and the high speed signal not from any HID device transmitted through the second USB port 102 are similar to the HID device signal and the high speed signal outputted by the hub H1.

The USB port provided by the hub H1 for transmitting the HID device signal is for plugging a mouse or a keyboard. Also, the USB port provided by the hub H1 for transmitting the high speed signal not from any HID device is for plugging a flash drive or an external hard disk. The HID device signal and the high speed signal outputted by the hub H1 when a mouse, a keyboard, a flash drive and an external hard disk are plugged in is split by the splitter module 10 into an HID device signal and a high speed signal not from any HID device, and then the HID device signal and the high speed signal are transmitted to the KVM switch S1. Thereby, the user can use a mouse, a keyboard, a flash drive, an external hard disk or other input devices to control one of the computer hosts PC1 and PC2.

It is worth mentioning that, the KVM switch S1 is electrically connected to an AV port T12 of the transmission extender T1 through an AV port S13. Thus, the video signal output from the computer host PC1 or PC2 is transmitted to the transmission extender T1 via a video signal transmission line V3. The transmission extender T1 has an element for processing the video signal, and the processed video signal is then transmitted to a display device M1 for display. The description about how the processed video signal is displayed by the display device M1 is omitted herein.

Figure 2:
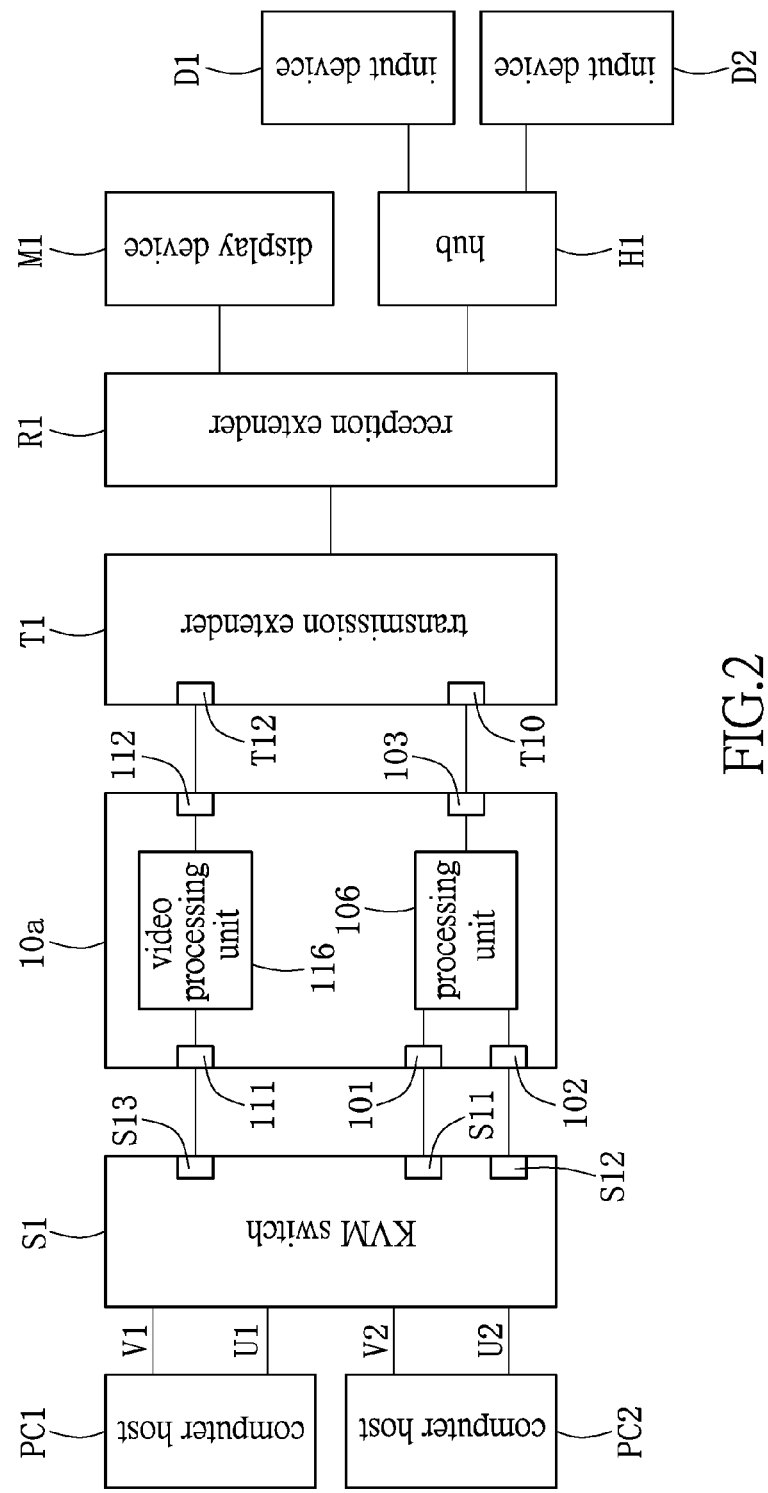
FIG. 2 shows a block diagram of a splitter module configured in a KVM system of another embodiment of the instant disclosure.

Refer to FIG. 2. FIG. 2 shows a block diagram of a splitter module configured in a KVM system of another embodiment of the instant disclosure. The configuration of the splitter module 10a shown in FIG. 2 is similar to the configuration of the splitter module 10 shown in FIG. 1, and thus for an easy instruction, similar reference numbers or symbols refer to elements alike. The difference between the splitter module 10 and the splitter module 10a is that, the splitter module 10a further comprises a first video transmission interface 111, a video processing unit 116 and a second video transmission interface 112.

The first video transmission interface 111 and the second video transmission interface 112 are a high-definition multimedia interface (HDMI), a video graphics array (VGA) interface, a digital video interface (DVI), a D-sub connector, a serial digital interface (SDI) or a display port (DP) interface. The video processing unit 116 can be, for example, a video processing chip, a video conversion chip, a graphics processing unit (GPU) or other video processors. However, the type of the video processing unit 116, the first video transmission interface 111 and the second video transmission interface 112 is not limited herein.

The first video transmission interface 111 is electrically connected to the KVM switch S1 and the video processing unit 116. The second video transmission interface is electrically connected to the transmission extender T1 and the video processing unit 116. The transmission extender T1 is electrically connected to the second video transmission interface 112, the third USB port 103 and the reception extender R1. The video signal from one of the computer hosts PC1 and PC2 can be transmitted to the transmission extender T1 through the first video transmission interface 111, the video processing unit 116 and the second video transmission interface 112, and then the transmission extender T1 transmits the video signal to the display device M1 for display. The description about how the processed video signal is displayed by the display device M1 is omitted herein.

Figure 3:
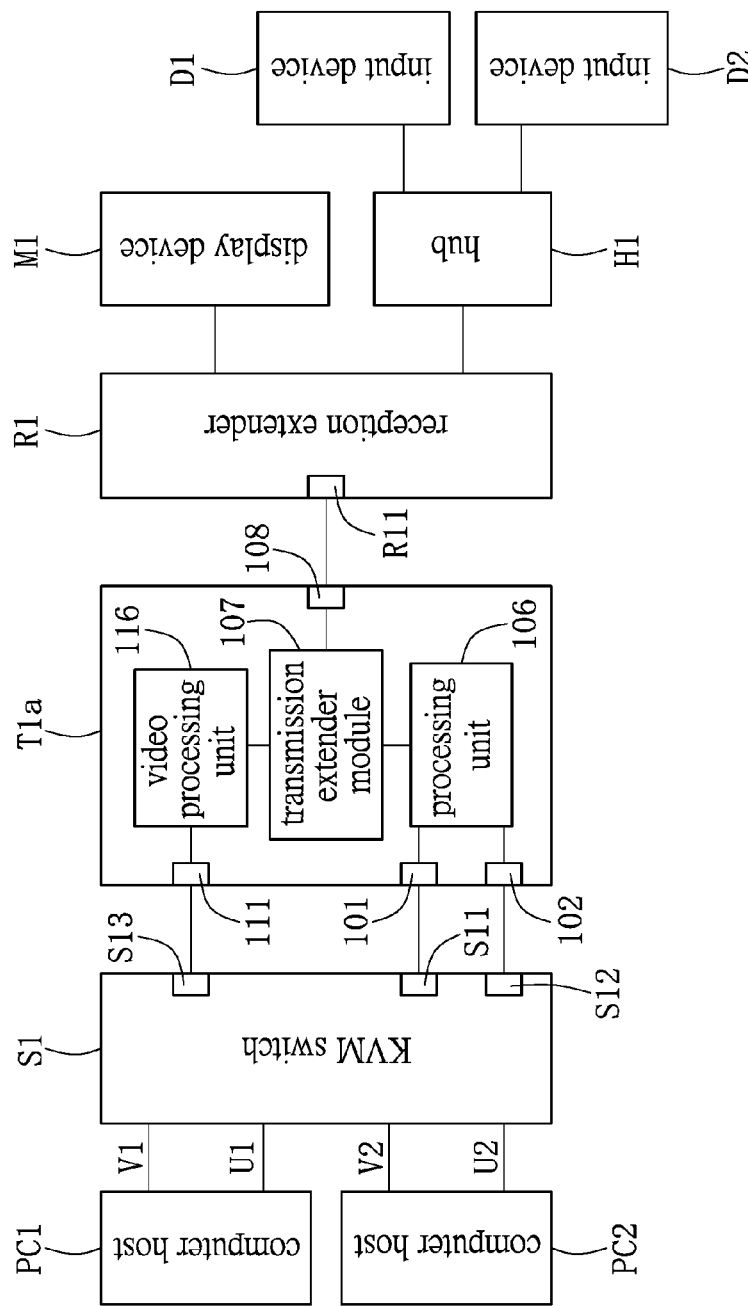
FIG. 3 shows a block diagram of a transmission extender having a splitter module configured in a KVM system of one embodiment of the instant disclosure.

Refer to FIG. 3. FIG. 3 shows a block diagram of a transmission extender having a splitter module configured in a KVM system of one embodiment of the instant disclosure. As shown in FIG. 3, a transmission extender T1a having a splitter module is electrically connected to a KVM switch S1, and the KVM switch S1 is electrically connected to a plurality of computer hosts PC1 and PC2.

The transmission extender T1a having a splitter module comprises a processing unit 106, a first USB port 101, a second USB port 102, a first video transmission interface 111, a video processing unit 116 and a communication port 108. To reduce the amount of devices in the KVM system and thus make the configuration of the KVM system less complex, the splitter modules 10 and 10a shown in FIG. 1 and FIG. 2 are configured in the transmission extender T1 in this embodiment.

The first USB port 101 is electrically connected to the KVM switch S1 and the processing unit 106. The second USB port 102 is also electrically connected to the KVM switch 51 and the processing unit 106. The communication port 108 is electrically connected to the processing unit 106 and a reception extender R1. The communication port 108 is a connection port for extending the signal transmission, such as a RJ-45 port, a network connection port, an optical fiber connection port, a coaxial cable connection port or other types of connection ports. In other words, between the transmission extender T1a having a splitter module and a reception extender R1, the video signal and/or the USB network packet can be transmitted through the CAT-5, CAT-5E, CAT6, CAT6E or CAT7 transmission line.

The first video transmission interface 111 is electrically connected to the KVM switch S1 and the video processing unit 116. The video processing unit 116 is electrically connected to the communication port 108. The reception extender R1 is electrically connected to a plurality of input devices D1 and D2 through the hub H1. The hub H1 has at least one USB port for transmitting the HID device signal and at least one HID device signal high speed signal not from any HID device.

The reception extender R1 transmits a USB signal to the communication port 108 of the splitter module 10 through a connection port R11 for extending the signal transmission. After that, the processing unit 106 processes the USB signal by splitting it into an HID device signal and a high speed signal not from any HID device. The HID device signal is transmitted to the KVM switch S1 through the first USB port 101, and the high speed signal is transmitted to the KVM switch S1 through the second USB port 102.

From the above, it is understood that, the transmission extender T1a having a splitter module can split a USB signal into an HID device signal and a high speed signal not from any HID device. Thereby, the user can simultaneously use a mouse, a keyboard, a flash drive, an external hard disk and other input devices in the KVM system to control the computer host PC1 or the computer host PC2. Except for the splitter module, the configuration of the transmission extender T1a is not limited herein.

Figure 4:
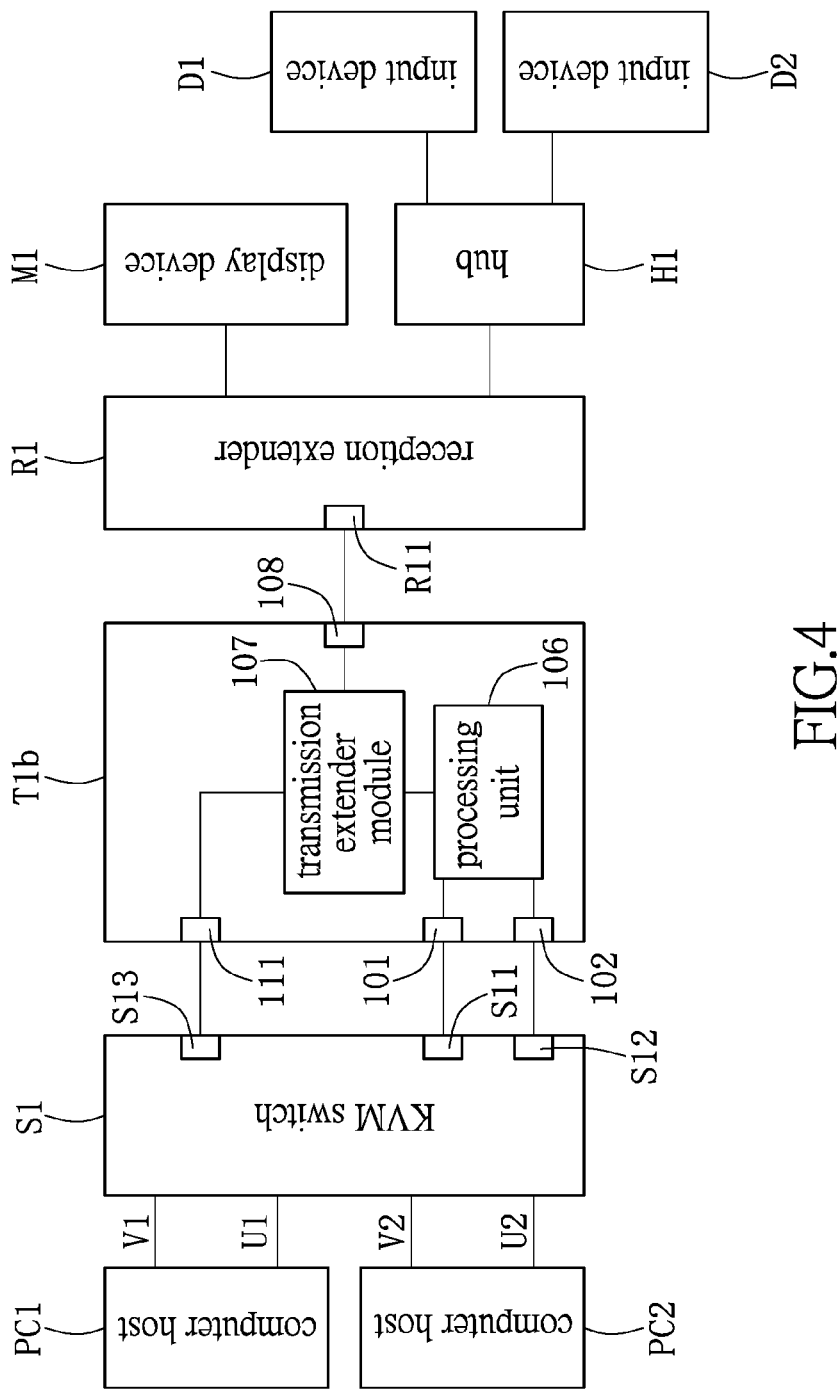
FIG. 4 shows a block diagram of a transmission extender having a splitter module configured in a KVM system of another embodiment of the instant disclosure.

Refer to FIG. 4. FIG. 4 shows a block diagram of a transmission extender having a splitter module configured in a KVM system of another embodiment of the instant disclosure. The configuration of the transmission extender T1b having a splitter module shown in FIG. 4 and the configuration of the transmission extender T1a having a splitter module shown in FIG. 3 are similar, and thus for easy instruction, similar reference numbers or symbols refer to like elements.

The difference between the transmission extenders having a splitter module T1a and T1b is that, the transmission extender having a splitter module T1b has no video processing unit 116 as shown in FIG. 3. Instead, the first video transmission interface 111 is electrically connected to the transmission extender module 107 directly. The transmission extender module 107 has an element for processing a video signal, and thus the transmission extender module 107 can process and convert the video signal. Except for the above difference, the working principles of the transmission extenders having a splitter module T1a and T1b are the same and thus the redundant information is not repeated. In addition, it should be noted that, the configuration of the transmission extender having a splitter module T1b shown in FIG. 4 is not limited herein.

To sum up, the splitter module and the transmission extender having the splitter module provided by the instant disclosure can be electrically connected to the KVM switch through the first USB port and the second USB port, and the splitter module splits a USB signal into an HID device signal and a high speed signal not from any HID device, to respectively transmit the signals to the KVM switch. The HID device signal refers to a signal from a mouse or a keyboard, and the high speed signal refers to a signal from a flash drive or an external hard disk but not from any HID device. Thereby, the splitter module and the transmission extender having the splitter module provided by the instant disclosure provide a great convenience for a user to use a mouse, keyboard, flash drive, external hard disk and other input devices in a KVM system at the same time.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A splitter module, comprising:
   a processing unit, being a signal splitter, configured to split a USB signal into an HID device signal and a non-HID device signal;
   a first USB port, electrically connected to the processing unit, transmitting the HID device signal which is output by the processing unit to a computer host;
   a second USB port, electrically connected to the processing unit, transmitting the non-HID device signal which is output by the processing unit to the computer host; and
   a third USB port, electrically connected to the processing unit, receiving the USB signal from at least one input device in which the input device is an HID device or a non-HID device;
   wherein the first USB port and the second USB port are electrically connected to a KVM switch respectively, the KVM switch is electrically connected to a plurality of computer hosts, the first USB port uses an USB HID protocol, the second USB port uses USB protocols other than the USB HID protocol, and the third USB port uses any USB protocol.

2. The splitter module according to claim 1, wherein the third USB port is electrically connected to a USB port of an extender, and the extender is electrically connected to one or more input devices through a hub, wherein the USB signal is transmitted through the USB port.

3. The splitter module according to claim 1, further comprising a first video transmission interface, a video processing unit and a second video transmission interface, the first video transmission interface electrically connected to the KVM switch and the video processing unit, the second video transmission interface electrically connected to an extender and the video processing unit.

4. A transmission extender having a splitter module, electrically connected to a KVM switch, the KVM switch electrically connected to a plurality of computer hosts, the transmission extender having the splitter module comprising:
   a processing unit, being a signal splitter, configured to split a USB signal into an HID device signal and a non-HID device signal;
   a first USB port, electrically connected to the processing unit, transmitting the HID device signal to a computer host;
   a second USB port, electrically connected to the processing unit, transmitting the non-HID device signal to the computer host;
   a transmission extender module, electrically connected to the processing unit; and
   a communication port, electrically connected to the transmission extender module, receiving the USB signal from at least one input device in which the input device is an HID device or a non-HID device;
   wherein the first USB port and the second USB port are electrically connected to a KVM switch respectively, the KVM switch is electrically connected to a plurality of computer hosts, the first USB port uses a USB RID protocol, the second USB port uses USB protocols other than the USB HID protocol, the communication port is a port for extending the signal transmission the communication port is electrically connected to a USB port of a reception extender, and the reception extender is electrically connected to one or more input devices, wherein the USB signal is received through the USB port of the reception extender.

5. The transmission extender having the splitter module according to claim 4, further comprising a first video transmission interface, the first video transmission interface electrically connected to the KVM switch and the transmission extender module, wherein the transmission extender module has an element for processing a video signal.

6. The transmission extender having the splitter module according to claim 4, further comprising a first video transmission interface and a video processing unit, the first video transmission interface electrically connected to the KVM switch and the video processing unit, the video processing unit electrically connected to the transmission extender module.

\* \* \* \* \*